Dec. 18, 1934.    E. H. BERKHUIJSEN    1,985,010
APPARATUS FOR BRINGING LIQUIDS AND GASES INTO INTIMATE CONTACT
Filed March 16, 1934
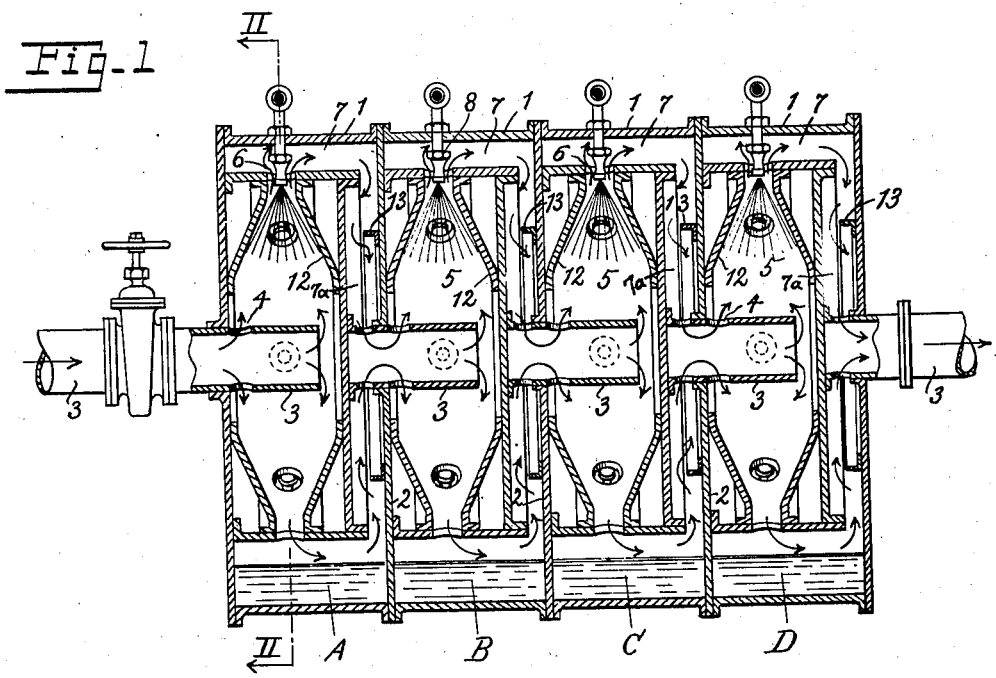
INVENTOR.
ERIC HENRI BERKHUIJSEN
BY Haseltine Lake & Co.
ATTORNEYS.

Patented Dec. 18, 1934

1,985,010

UNITED STATES PATENT OFFICE 1,985,010

APPARATUS FOR BRINGING LIQUIDS AND GASES INTO INTIMATE CONTACT

Eric Henri Berkhuijsen, The Hague, Netherlands

Application March 16, 1934, Serial No. 715,808
In the Netherlands November 23, 1932

5 Claims. (Cl. 261—115)

This invention relates to apparatus for bringing liquids and gases into intimate contact and is concerned more particularly with apparatus for scrubbing gases by means of a scrubbing liquid.

Though not limited thereto, the apparatus is adapted to be used e. g. for the scrubbing of coal-gas for the removal of tar, ammonia, benzol, naphthalene and the like products, for the elimination of the iron from water or for the elimination of coal-dust from the flue gases and so on.

In a known apparatus of this type generally known as "gas-scrubbers", the scrubbing of the gas is effected by passing it through groups of wooden blades, which are mounted in a series of chambers, the blades being rotated continually and during rotation pass through a scrubbing liquid in which the blades are partly immersed. In this arrangement however the gas remains in contact with the scrubbing liquid for a short time only and engages on the relatively small part of the surface of the blades which is not immersed. Also the back pressure in each of the chambers is normally very great and is still more increased by tar-deposits and the like, which necessitate the frequent interchanging of the groups of blades, also the apparatus is costly and moreover has the great disadvantage that the wooden blades have to be removed and cleaned from time to time, thus causing considerable loss of time.

In a further type of known apparatus, the gas together with the scrubbing liquid is passed in one direction through several chambers, which are provided with a group of separate tubes of relatively small diameter; within which tubes helicoidal elements may be provided. In this apparatus gas and liquid are forced as much as possible to flow along the surface of the stationary tubes during their passage through the chambers, but no sufficiently intimate contact between gas and liquid is obtained since the liquid is sprinkled by means of jet-pipes more or less over the tubes only.

All the above mentioned disadvantages are overcome by the present invention in which the use of a filling-mass such as blades or tubes is avoided, while nevertheless the contact surface between gas and liquid is as large as possible.

The invention consists of apparatus for mutually bringing liquids and gases into intimate contact, and more particularly for scrubbing gases, comprising a plurality of scrubbing chambers into which the gas to be scrubbed is supplied in a free flow, means being provided at one or more points for introducing, in a finely divided state, the scrubbing liquid into direct contact with the stream of gas to be treated.

By atomizing the scrubbing-liquid under pressure and thus feeding it into the scrubbing chamber in the form of a fine mist in a direction preferably opposite to the stream of gas, an intimate contact between gas and liquid can be obtained.

According to the invention the gas may enter each of the chambers in an axial direction, flow to the periphery in a radial direction and may then be led to the inlet of the next chamber through separate channels, while at different points of said periphery nozzles are provided for spraying the liquid in the direction of the gas inlet. However without leaving the scope of the invention, the gas to be treated also may be led through the apparatus in a reversed sense.

In said embodiment of the invention also, the scrubbing chambers are circular in cross-section, stationary and have spraying or atomizing nozzles, or the like mounted radially around their peripherial walls, said nozzles being arranged in spaced relationship and connected to a common pressure-feed pipe in series with a circulating-pump for each of the scrubbing-chambers. The scrubbing liquid is fed in at one end in counter flow to the gas through the compartments and is drawn off at the other end.

In providing the atomizing-nozzles in a known manner, with a helicoidal means, the liquid can be sprayed in a fine diverging mist. Furthermore stationary deflecting plates of suitable shape may be arranged to diverge from the points of said nozzles, so that the stream of gas is forced to converge to the spraying nozzles, thus ensuring mutual and intimate contact of the gas and liquid.

The number of the atomizing nozzles, as well as the size and also the manner of mounting them, may be varied in each of the scrubbing chambers so that the character of the liquid spray can be varied to suit the special requirements for the scrubbing in each chamber.

The lower tar fractions, mechanical impurities and the like, being separated during the scrubbing process and which in the known apparatus caused internal stoppages so as to spoil the filling mass, may be easily carried off in the present apparatus by removing the scrubbing liquid, while the eventual contamination of the scrubbing liquid which obviously will take place after a much longer time, can easily be removed.

The cleaning of the gas however is not influenced by such sediments in the liquid collection tank.

In order that the invention may be more clearly understood one particular construction of apparatus made in accordance therewith will now be described, by way of example, with reference to the accompanying drawing wherein:

Figure 1 is a longitudinal section of the apparatus and

Figure 2 is a cross-section through the scrubbing-compartments, on the line II—II of Figure 1.

In the construction shown in the drawing four compartments 1 of circular cross-section are provided and are separated by partitions 2. A supply line 3 for the gas is provided with outlets 4 through which the gas is adapted to flow freely into the centre of the scrubbing chambers 5 in all directions. The gas is conveyed to the centre of each scrubbing chamber successively, through passages 6, channels 7 arranged along the peripherial walls of the compartments, and transverse channels 7a formed between the adjacent chambers by the partitioning walls 2 of the compartments 1 and opening into the centre of the next chamber as shown clearly by arrows in Figure 1. Mounted in the outer peripheral walls of each of the compartments 1 and projecting into the chambers 5 are a series of atomizing nozzles 8, arranged in spaced relationship around the circumference of said compartments 1 as shown in Figure 2, the nozzles proper being situated in the passage 6. Each series of nozzles 8 is connected to a separate pipe line 9 through which the scrubbing liquid is fed under pressure. Each of said pipe lines 9 is connected to a pump 10 which continuously pumps liquid from collecting tank 11 in the bottom of the compartments 1, to the nozzles 8 in a closed circuit. The liquid after being sprayed into the chambers 5 again collecting in the tank 11.

In operation the gas to be treated is blown or sucked through the line 3, whereby it enters the scrubbing chambers 5 through the outlets 4 and flows freely to the periphery of these chambers and thereby comes in intimate contact with the scrubbing liquid, which is sprayed into it by the nozzles 8. These atomizing nozzles 8 are preferably of the known water-sprayer type having helicoidal devices by means of which the liquid which is supplied under pressure, is sprayed in the form of a diverging atomized mist. The openings 4 are arranged in the supply line 3 in such a way that the gas is forced to pass as much as possible through the active part of the atomized liquid, thus an intimate contact between liquid and gas is obtained. This action may be still more increased by providing deflecting plates 12, by which the gas is forced to converge towards the nozzles 8 in the passages 6 and so through the sprayed liquid. After the gas is treated in this way in the first of the chambers 5 it passes in similar manner, through channels 7 and 7a and openings 4 and so successively through all the other scrubbing channels in each of which the scrubbing treatment is repeated.

In the channels 7a baffle plates 13 are provided for separating as much as possible the drops of liquid conveyed by the stream of gas.

It will be clearly seen that with the apparatus according to the present invention an effective and economical scrubbing is obtained, whereby by the intimate contact of liquid and gas a practically complete absorption of the damps to be separated by the liquid and/or removal of solid particles is insured. The apparatus is simple and only requires a minimum cost of maintenance.

The invention is not limited to the embodiment illustrated in the drawing, but may be modified as regards its construction in detail. The scrubbing-chambers may also be of rectangular or any other cross-section and also the supplying and directing of the gas respectively, may be accomplished in any other suitable manner.

It must also be understood that the apparatus is not limited to any particular use for instance it can be used for the scrubbing of coalgas removing tar, ammonia, benzol, naphthalene and like products therefrom, for example for eliminating the iron from water. In other words the invention may be applied in all cases where for scrubbing purposes an intimate contact between any liquid and any gas is required.

Having now particularly described and ascertained the nature of my said invention, and in what manner the same is to be performed, I declare that what I claim is:—

1. Apparatus for bringing liquids and gases into mutual and intimate contact for scrubbing purposes, comprising a series of wholly fixed and stationary chambers free from internal moving parts, means for passing a stream of gas through said chambers in succession, liquid sprayers or atomizers located at different points of the periphery of said chambers for projecting the scrubbing liquid inwardly in a finely divided state, gas ports in said periphery of each chamber adjacent to said atomizers, and gas ports disposed at the central portion of each chamber.

2. Apparatus for bringing liquids and gases into mutual and intimate contact for scrubbing purposes, comprising a series of wholly fixed and stationary chambers free from internal moving parts, liquid sprayers or atomizers located at different points of the periphery of said chambers for projecting the scrubbing liquid inwardly in a finely divided state, gas ports in the periphery of each chamber adjacent to said atomizers, gas ports disposed practically at the centre of each chamber, means connecting the gas ports in said periphery of each chamber to the gas ports at the centre of the next succeeding chamber, and means for admitting a stream of gas to the first and withdrawing it from the last of said series of chambers.

3. Apparatus for bringing liquids and gases into mutual and intimate contact for scrubbing purposes, comprising a series of wholly fixed and stationary chambers free from internal moving parts and of circular cross section, means for passing a stream of gas through said chambers in succession, liquid sprayers or atomizers located at different points of the peripheries of said chambers for projecting the scrubbing liquid inwardly towards the axis of the chambers in a finely divided state, gas ports in the periphery of each chamber and adjacent to said atomizers, and gas ports disposed practically at the centre of each chamber.

4. Apparatus for bringing liquids and gases into mutual and intimate contact for scrubbing purposes, comprising a series of wholly fixed and stationary chambers free from internal moving parts, means for passing a stream of gas through said chambers in succession, liquid sprayers or atomizers located at different points of the periphery of said chambers for projecting the scrubbing liquid inwardly in a finely divided state, gas ports in the periphery of each chamber adjacent to said atomizers, gas ports disposed practically at the centre of each chamber, and conveying means for the gas in said chambers converging towards said periphery and approximately corresponding to the introduced diverging cone of atomized liquid.

5. Apparatus for bringing liquids and gases into mutual and intimate contact for scrubbing purposes, comprising a series of wholly fixed and stationary chambers free from internal moving parts, liquid s